(12) United States Patent
Modica et al.

(10) Patent No.: US 9,519,061 B2
(45) Date of Patent: Dec. 13, 2016

(54) GEOMETRIC FINGERPRINTING FOR LOCALIZATION OF A DEVICE

(71) Applicant: HERE Global B.V., Veldhoven (NL)

(72) Inventors: Leo Modica, Sawyer, MI (US); Leon Stenneth, Chicago, IL (US); James Lynch, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/583,375

(22) Filed: Dec. 26, 2014

(65) Prior Publication Data

US 2016/0189385 A1 Jun. 30, 2016

(51) Int. Cl.
*G01S 17/89* (2006.01)
*G01C 21/00* (2006.01)
(Continued)

(52) U.S. Cl.
CPC ............. *G01S 17/89* (2013.01); *G01C 21/005* (2013.01); *G01S 5/16* (2013.01); *G01S 7/4808* (2013.01); *G01S 17/06* (2013.01); *G05D 1/0274* (2013.01); *G06T 7/0044* (2013.01); *G06T 7/0081* (2013.01); *G06T 7/602* (2013.01);
(Continued)

(58) Field of Classification Search
CPC ........ G01S 17/89; G01S 13/89; G01C 21/005; G01C 21/30; G01C 21/3602; G05D 1/0274; G06T 7/0042–7/0046
See application file for complete search history.

(56) References Cited

U.S. PATENT DOCUMENTS 5,684,695 A * 11/1997 Bauer .................... G01S 13/89
701/23
6,233,522 B1   5/2001 Morici
(Continued)

FOREIGN PATENT DOCUMENTS

CA 2400975 C 11/2008
CA 2689189 A1 2/2009
(Continued)

OTHER PUBLICATIONS

Weiss et al., "Precise Ego-Localization in Urban Areas using Laserscanner and High Accuracy Feature Maps", Proceedings of the 2005 IEEE Intelligent Vehicles Symposium, Jun. 6-8, 2005, pp. 284-289.*
(Continued)

*Primary Examiner* — Behrang Badii
*Assistant Examiner* — David Testardi
(74) *Attorney, Agent, or Firm* — Lempia Summerfield Katz LLC

(57) ABSTRACT

Systems, apparatuses, and methods are provided for developing a fingerprint database for and determining the geographic location of an end-user device (e.g., vehicle, mobile phone, smart watch, etc.) with the database. A fingerprint database may be developed by receiving a depth map for a location in a path network, and then identifying physical structures within the depth map. The depth map may be divided, at each physical structure, into one or more horizontal planes at one or more elevations from a road level. Two-dimensional feature geometries may be extracted from the horizontal planes. At least a portion of the extracted feature geometries may be encoded into the fingerprint database.

20 Claims, 12 Drawing Sheets

(51) Int. Cl.
*G05D 1/02* (2006.01)
*G01S 17/06* (2006.01)
*G01S 5/16* (2006.01)
*G01S 7/48* (2006.01)
*G06T 7/00* (2006.01)
*G06T 7/60* (2006.01)

(52) U.S. Cl.
CPC .............. *G06T 2207/10028* (2013.01); *G06T 2207/20021* (2013.01); *G06T 2207/30248* (2013.01)

(56) References Cited

U.S. PATENT DOCUMENTS

| | | | |
|---|---|---|---|
| 6,526,352 B1 * | 2/2003 | Breed | G01C 21/3697 342/357.31 |
| 6,912,293 B1 | 6/2005 | Korobkin | |
| 7,392,151 B2 * | 6/2008 | Makela | G01C 21/30 702/150 |
| 7,969,558 B2 | 6/2011 | Hall | |
| 8,588,471 B2 * | 11/2013 | Hsieh | G06K 9/00201 382/106 |
| 8,610,881 B2 | 12/2013 | Gammenthaler | |
| 8,630,805 B2 * | 1/2014 | Becker | G01S 13/867 342/179 |
| 9,056,395 B1 * | 6/2015 | Ferguson | G08G 1/09623 |
| 9,141,852 B1 * | 9/2015 | Cosgun | G06K 9/00335 |
| 2009/0228204 A1 * | 9/2009 | Zavoli | G01C 21/30 701/532 |
| 2010/0020074 A1 * | 1/2010 | Taborowski | G06T 7/0065 345/420 |
| 2012/0257814 A1 | 10/2012 | Kohli et al. | |
| 2013/0103298 A1 * | 4/2013 | Becker | G01S 13/89 701/300 |
| 2014/0225771 A1 * | 8/2014 | Phuyal | G01S 17/023 342/357.28 |
| 2015/0029186 A1 * | 1/2015 | Pope | G06K 9/00 345/420 |
| 2016/0187144 A1 * | 6/2016 | Modica | G01C 21/20 382/154 |
| 2016/0188996 A1 * | 6/2016 | Modica | G06K 9/4604 382/203 |

FOREIGN PATENT DOCUMENTS

| | | |
|---|---|---|
| CN | 101398933 A | 4/2009 |
| CN | 102520401 B | 5/2013 |
| EP | 2150057 A2 | 2/2010 |
| WO | WO 2011/023246 A1 * | 3/2011 |
| WO | WO2012012860 A1 | 2/2012 |

OTHER PUBLICATIONS

Ibeo ALASCA User Manual, Version 2.0.0, Date Feb. 15, 2006, 70 pages.*
Schlichting, Alexander et al. "Localization Using Automotive Laser Scanners and Local Pattern Matching", 2014 IEEE Intelligent Vehicles Symposium (IV), Jun. 8-11, 2014. Dearborn, Michigan, USA, pp. 414-419.*
Zhao, Sheng et al. "2D LIDAR aided INS for vehicle positioning in urban environments", 2013 IEEE International Conference on Control Applications (CCA), Part of 2013 IEEE Multi-Conference on Systems and Control Hyderabad, India, Aug. 28-30, 2013, pp. 376-381.*
Sick AG, "LMS200/211/221/291 Laser Measurement Systems", Technical Description, 8008970/Q172/2006-12, Dec. 2006, 48 pages.*
PCT International Search Report and Written Opinion of the International Searching Authority dated Apr. 28, 2016 for corresponding PCT/IB2015/002511.

* cited by examiner

GEOMETRIC FINGERPRINTING FOR LOCALIZATION OF A DEVICE

FIELD

The following disclosure relates to developing a fingerprint database and determining the geographic location of an end-user device (e.g., vehicle, mobile phone, smart watch, etc.) using the database, in some cases, in the absence of global positioning system (GPS) data.

BACKGROUND

Vehicle localization using Global Positioning Systems (GPS), local area wireless technology (e.g., WiFi), and short-wavelength radio waves (e.g., Bluetooth) may be imprecise. In the case of GPS, multi-pathing causes timing variations for signals received by the vehicle. In the case of WiFi and Bluetooth, signal strengths are an unreliable means for localization due primarily to occlusion and lack of precision in the location of the transmitting stations in three-dimensional (3D) space. In such cases, the references upon which multilateration is performed are not precise enough to produce lane level, or in some case road level, positioning.

SUMMARY

Systems, apparatuses, and methods are provided for developing a fingerprint database and determining the geographic location of a device with the database. In one embodiment, the method comprises receiving a depth map for a location in a path network. The method further comprises identifying, using a processor, physical structures within the depth map. The method further comprises dividing the depth map, at each physical structure, into one or more horizontal planes at one or more elevations from a road level. The method further comprises extracting two-dimensional feature geometries from the horizontal planes. The method further comprises encoding at least a portion of the extracted feature geometries into a database.

In yet another embodiment, the method comprises collecting a depth map at a location in a path network using a depth sensing camera attached to a device. The method further comprises identifying, using a processor, physical structures within the depth map at the location. The method further comprises dividing the depth map, at each physical structure, into one or more horizontal planes at one or more elevations from a road level. The method further comprises extracting two-dimensional feature geometries from the horizontal planes. The method further comprises determining a geographic location of the device through a comparison of at least a portion of the extracted feature geometries and a database of feature geometries for the path network.

In another embodiment, the apparatus comprises at least one processor and at least one memory including computer program code for one or more programs; the at least one memory and the computer program code configured to, with the at least one processor, cause the apparatus to at least perform: (1) receive a depth map for a location in a path network; (2) identify physical structures within the depth map at the location; (3) divide the depth map, at each physical structure, into one or more horizontal planes at one or more elevations from a road level; (4) extract two-dimensional feature geometries from the horizontal planes; and (5) encode at least a portion of the extracted feature geometries into a database.

In yet another embodiment, the apparatus comprises at least one processor and at least one memory including computer program code for one or more programs; the at least one memory and the computer program code configured to, with the at least one processor, cause the apparatus to at least perform: (1) collect a depth map for a device in a path network; (2) identify physical structures within the depth map at the location; (3) divide the depth map, at each physical structure, into one or more horizontal planes at one or more elevations from a road level; (4) extract two-dimensional feature geometries from the horizontal planes; and (5) determine a geographic location of the device through a comparison of at least a portion of the extracted feature geometries and a database of feature geometries for the path network.

BRIEF DESCRIPTION OF THE DRAWINGS

Exemplary embodiments are described herein with reference to the following drawings.

DETAILED DESCRIPTION

Figure 1:
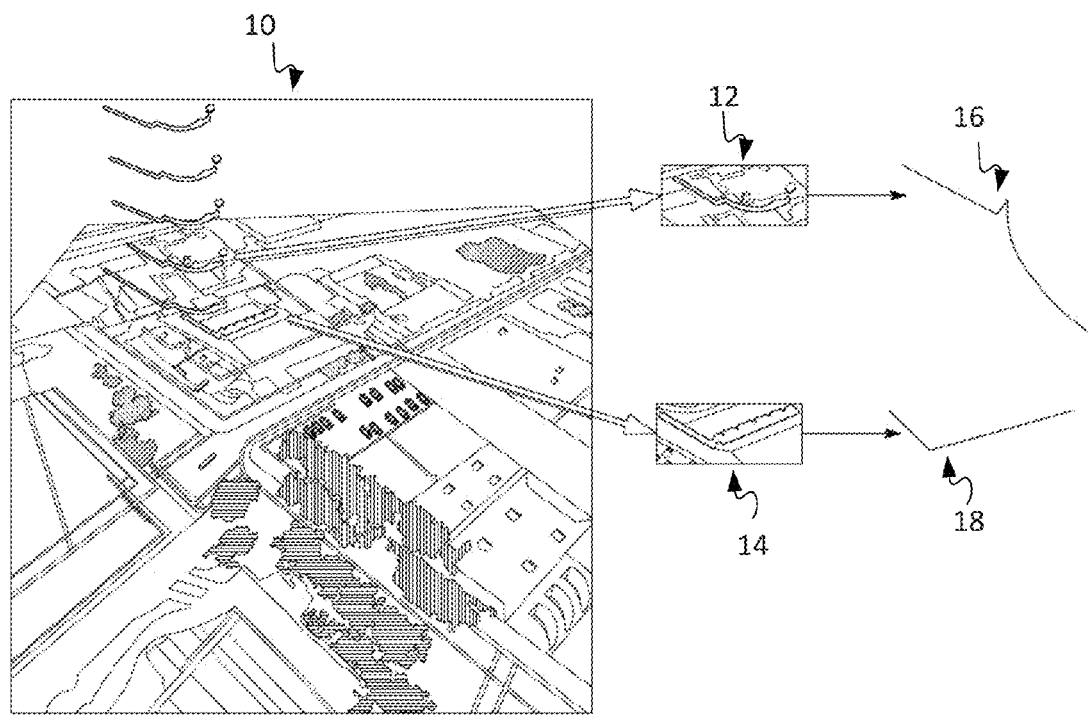
FIG. 1 illustrates an example of a depth map image with extracted horizontal slices at multiple elevations, and identified two-dimensional images from the extracted slices.

The location or positioning of an end-user device may be determined through the derivation of coordinates from two-dimensional (2D) feature geometries representing real objects in a path (e.g., road) network. An end-user device may refer to a device operated or used by a consumer. Non-limiting examples of end-user devices, as used herein, include vehicles (e.g., cars, trucks, buses, trains, motorcycles, boats, ships), as well as portable electronic devices such as mobile phones, laptop computers with wireless capabilities, video recording devices, scanning devices, messaging devices, personal digital assistants, and wearable computers (e.g., smart watches). Feature geometries may refer to two-dimensional shapes such as lines, arcs, and splines (e.g., B-splines) extracted from three-dimensional structures around the device. For example, the 2D feature geometries may be extracted from three-dimensional structures such as building facades, road signs, polls, plants (e.g., trees), or other non-transitory structures existing in the path network. Multiple feature geometries at a particular road segment may be combined together to provide one or more unique fingerprints identifying the particular road segment from the surrounding area.

In other words, the location of a device (e.g., vehicle) may be determined based on an identification of a fingerprint for the various features surrounding the device. The location may be determined in real-time, wherein features identified by the device are compared with a database of the feature geometries/fingerprints. The precision of the determined location may be based on the location of the devices in the path network and the method by which the devices are located.

Such a localization process may allow for improved positioning of the device over conventional geo-positioning technologies such as GPS, WiFi, or Bluetooth. Furthermore, feature-based, visual positioning techniques may allow for positioning of a device in the absence of any available conventional geo-positioning technologies (e.g., GPS). Additionally, the feature-based positioning technique using simple 2D feature geometries may reduce overall computation costs associated with determining the location of the device in real-time. This eliminates the need for an expensive graphics processing unit (GPU) to process imagery in real-time, and allows for vehicles with low cost visualization technology to utilize the proposed feature-based localization techniques described herein. Furthermore, more and more vehicles are being built with sophisticated viewing technology and could utilize the proposed georeferencing process.

As discussed herein, a database of two-dimensional feature geometries may be developed through a collection of depth maps produced by depth sensing devices (e.g., a high-precision Light Detection and Ranging (LIDAR) device). From the collected depth maps, feature geometries such as buildings, traffic lights, stop signs, plants (e.g., trees), and road properties (e.g. width, number of lanes) may be extracted. The extracted features may be represented or encoded in a separate database as a fingerprint for a particular location. An end-user device (e.g., vehicle) may determine its location based upon the device's own identification of feature geometries and comparison with the fingerprint database of feature geometries, wherein the location is determined based upon a matching of features or fingerprints.

Collection of Data

In certain embodiments, a database housing various feature geometries for a path network may be developed through the collection and analysis of data for the path network. The path network may be a road network comprising a selected number of road segments within a metropolitan area or city. In some embodiments, the database may be developed for multiple road segments in multiple metropolitan areas or cities.

As used herein, a "road" or "road segment" may refer to any traveling lane or pathway that may be capable of being monitored, or may become capable of being monitored in the future (e.g., a highway, city street, bus route, train route, walking/biking pathway, waterway).

In certain embodiments, the database is developed through the collection of (1) three-dimensional data on the selected road segments within the road network, and (2) location data (e.g., GPS data) associated with the 3D data. The 3D data may be depth maps or point cloud data acquired using 3D optical distancing systems or intensity-based scanning techniques. In certain embodiments, depth maps or point cloud data are collected using a depth sensing device. The depth sensing device may be any depth sensing stereoscopic or stereo-camera (e.g., a LIDAR camera), a radio detection and ranging (RADAR) device, an ultrasound device, or a structure light camera. The depth sensing device may comprise a moving mono-camera configured to identify three-dimensional structures from motion.

LIDAR, also known as LiDAR, Lidar, or other similar representations, may also be referred to as three-dimensional laser scanning or an optical distancing system, which employs one or more lasers or cameras to collect data points representing an area, such as an area about a road or walkway.

The LIDAR camera in the data acquisition system may use ultraviolet, visible, or near-infrared light to image objects, targeting a wide range of materials, such as non-metallic objects, rocks, rain, chemical compounds, aerosols, clouds, and even single molecules. A narrow laser-beam may map physical features with high resolution.

Software may generate a depth map or point cloud based on the measured distance, the locations of the optical distancing system, which may be on a moving platform such as a car, and the angle of the laser. Other optical distancing systems include a stereoscopic camera, a time of flight infrared camera, and a structured light device. A LIDAR camera collects and gathers data points in a point cloud in which each data point corresponds to a local coordinate, such as (x, y, z), and is either on or off. Alternatively, the LIDAR data may be a grayscale point cloud including an intensity (indicating reflectivity) for each data point, in a predetermined range of values (e.g., 0 to 255, 0 to 65536) with black at one end of the range and white at the other. The point cloud may be stored in ASCII or LIDAR exchange format (e.g., the American Society for Photogrammetry and Remote Sensing (ASPRS) .LAS file format). The one or more lasers may be in a near infrared spectrum (such as about 700 nm to about 5000 nm or about 800 nm to about 2500 nm) or other light spectrum.

In certain embodiments, the LIDAR camera may be attached or otherwise integrated with a data collection device (e.g., vehicle). There may also be a positioning system integrated with the LIDAR vehicular system such as a GPS to provide a base reference for the data acquired by the LIDAR system. The mobility of a vehicular system may facilitate acquiring data across a large geographic area using established positions for reference and integration of the acquired data into a point cloud representing the geographic area.

In the development of a fingerprint database, the LIDAR data acquisition system may be combined with a geographic positioning system (GPS) to provide a base reference for the data acquired by the LIDAR system. Through the combination of the LIDAR system and the GPS, the 3D data collected can be saved or encoded into a database with attributed latitude, longitude, altitude, and elevation measurements.

The mobility of a vehicular system may facilitate acquiring data across a large geographic area using established positions for reference and integration of the acquired data into a point cloud representing the geographic area. In some embodiments, depth map or point cloud data may be collected continuously as the data collection vehicle travels along the selected road segments within the path network. In other embodiments, the data may be collected at predefined intervals along the road segments (such as every 10 to 30 meters).

In certain embodiments, the data from one or more data collection vehicles may be uploaded to a map developer database for future analysis. In some embodiments, the uploading process may be conducted after the data collection vehicle(s) have completed their collection of the depth map or point cloud data. In other embodiments, the uploading process may comprise transmitting data over a connected network to the map developer database as the data is collected.

Feature Extraction

Following collection and uploading of the depth map or point cloud data to the map developer database, the data may be analyzed for various feature geometries within the depth map or point cloud data. In other words, a computer algorithm may be run to search for specific two-dimensional features in the depth map data, and extract those features. The two-dimensional feature geometries may include lines, sets of connected lines or curves, arcs, and splines within the physical structures of the depth map. In certain embodiments, the physical structures comprise building facades, road signs, street lights, and plants (e.g., trees) of the point cloud data.

Two-dimensional feature geometries may be extracted from a depth map by identifying the physical structures of the depth map, and dividing or slicing the depth map into one or more horizontal planes at different elevations of the physical structure. The depth map data within each horizontal slice/segment may then be analyzed for certain geometries. In the dividing or slicing process, the depth map data is extracted from the defined elevation, as well as data that exists within a range above and below the defined elevation. For example, the extraction includes an aggregation of data within 0.1 meters, 0.2 meters, 0.5 meters, 1 meter, or 2 meters of the defined elevation. In other words, the horizontal slice or segment has a thickness of less than 0.1 meters, less than 0.2 meters, less than 0.5 meters, less than 1 meter, less than 2 meters, 0.1-2 meters, 0.1-1 meters, 0.1-0.5 meters, or 0.1-0.2 meters. In some embodiments, the depth map data within the range above and below the defined elevation is merged or averaged together.

Analysis of the depth map data may be a dynamic or iterative process. In certain embodiments, more than one horizontal plane is analyzed in order to find a prominent or useful feature geometry within the depth map. For example, in certain embodiments, a first elevation is chosen, and the depth map is sliced into a horizontal plane at the first elevation. This slicing process and analysis alleviates the need to perform a complex three-dimensional feature recognition or classification for an entire building or observed structure.

The horizontal plane is analyzed for prominent feature geometries such as straight lines, sets of connected lines or curves, arcs, or splines. In some embodiments, the horizontal plane is analyzed for prominent feature geometries such as sets of connected lines. For example, in the sets of connected lines may comprise two-dimensional shapes including quadrilaterals such as squares and rectangles; or other polygons such as triangles, pentagons, hexagons, heptagons, octagons, nonagons, decagons, etc. In other embodiments, the horizontal plane may be analyzed for prominent connected curve shape geometries such as circles or ellipses. This slicing process and analysis alleviates the need to perform a complex three-dimensional feature recognition or classification for an entire building or observed structure.

To the extent no useful features are identified in the extracted horizontal plane at the first elevation, a second elevation may be chosen, wherein data is extracted at the second elevation and analyzed. The process may be repeated at multiple elevations until at least one prominent or useful feature geometry is identified. In some embodiments, the process begins at a higher elevation from the road level and works down to the road in elevation increments (e.g., every 5 meters). The beginning elevation may be determined based upon provided cartography data for the particular road segment area, wherein the approximate height of a building along the road segment is known. Cartography data may be provided to the map database from a separate source, and is not necessarily compiled at the same time the data collection vehicle compiles and reports LIDAR data to the database.

In certain embodiments, the extraction and analysis may be performed at a number of predefined elevations (e.g., every 5 meters from the road level). The highest elevation from road level for each road segment in the path network may be a fixed value (such as 50 meters or 100 meters above the road level), or it may be a variable value based upon known cartography data for each road segment location (e.g., the highest elevation analyzed for one road segment may be 20 meters above the road level, as the highest building or structure at the road segment location is 20 meters high). Following the extraction and analysis at the multiple elevations, at least a portion of the extracted geometric features may be selected for storage in a fingerprint database. In some embodiments, the extracted features are sorted or ranked based upon their shape, size, elevation, and variance/invariance. The determination on the ranking or sorting of features is discussed in greater detail below.

Extraction of geometries for each horizontal slice or plane may be conducted using various algorithms, wherein the depth map data in the slice is converted into one or more two-dimensional geometries. In certain embodiments the algorithm is a linear regression algorithm, a curvilinear regression algorithm, a machine learning algorithm, or a combination thereof. For example, to the extent a linear geometric feature is observed in the depth map slice, a linear regression algorithm is used to extract the linear feature from the depth map slice and convert the depth map data into a 2D line or set of connected lines. To the extent an arc or spline is observed in the depth map slice, a curvilinear regression algorithm is used to extract the arc or spline feature from the depth map slice and convert the depth map data into a 2D arc or spline. In some embodiments, more than one geometric feature may be observed within the slice. In such cases, both linear regression and curvilinear regression algorithms may be performed to extract the linear and curvilinear features in the slice and convert the data into 2D representations including lines, sets of connected lines or curves, arcs, splines, etc.

FIG. 1 provides one non-limiting example of a depth map image 10 having horizontal slices at different elevations. In this figure, two elevations have been analyzed for feature geometries, depicted as a first elevation 12 and a second elevation 14. Through linear regression algorithms, curvilinear regression algorithms, and/or machine learning algorithms, features in the depth map data of the first elevation 12 are extracted and represented as a first 2D representation 16 including a combination of connected lines and an arc. In the second elevation 14, the extraction process has produced a second 2D representation 18 at the second elevation comprising two lines.

Encoding Feature Geometries in Fingerprint Database

In certain embodiments, the extracted feature geometries may be georeferenced and encoded in a fingerprint database for future use. That is, a fingerprint database with the encoded feature geometries may be accessed to assist in determining the location of a data collection device (e.g., vehicle) in communication with the database (as discussed in greater detail below).

In certain embodiments, the extracted feature geometries may be georeferenced with certain information, such as the geographic locations (e.g., latitude, longitude, elevation, altitude) of specific features or points of the geometries. These two-dimensional feature geometries may be georeferenced to a map or geographic location using an algorithm that matches various points of the 2D geometries with location reference information or values for one or more of the following: latitude, longitude, elevation from the road level, and altitude. This process is possible when the depth sensing camera (e.g., LIDAR camera) conducting the analysis and extracting is in communication with a data collection vehicle having a known geographic location (e.g., using GPS or another georeferencing apparatus). With a known vehicle location, and a known distance of the vehicle from the extracted geometries through the depth sensing system, geographic values may be assigned or referenced to the extracted geometries.

For example, when the feature geometry is a line or set of connected lines, points along the line or set of connected lines (including the end points of the line or set of connected lines) may be georeferenced with location reference information regarding the latitude, longitude, elevation above the road, and altitude of the line points. For arc geometries, points along the arc may be georeferenced, therein providing information regarding the radius, latitude, longitude, elevation above the road, and altitude of the arc points. For splines, points along the spline may be georeferenced to provide information regarding the knots, latitude, longitude, elevation above the road, and altitude of the spline points.

Following georeferencing of the extracted feature geometries, the georeferenced 2D geometries may be encoded in fingerprint database. In certain embodiments, the fingerprint database may store the feature geometries based upon the location of the extraction. For example, the features may be linked with a vehicle reference (such as the vehicle's geographic location at the time the feature geometry was identified and extracted.

Figure 2:
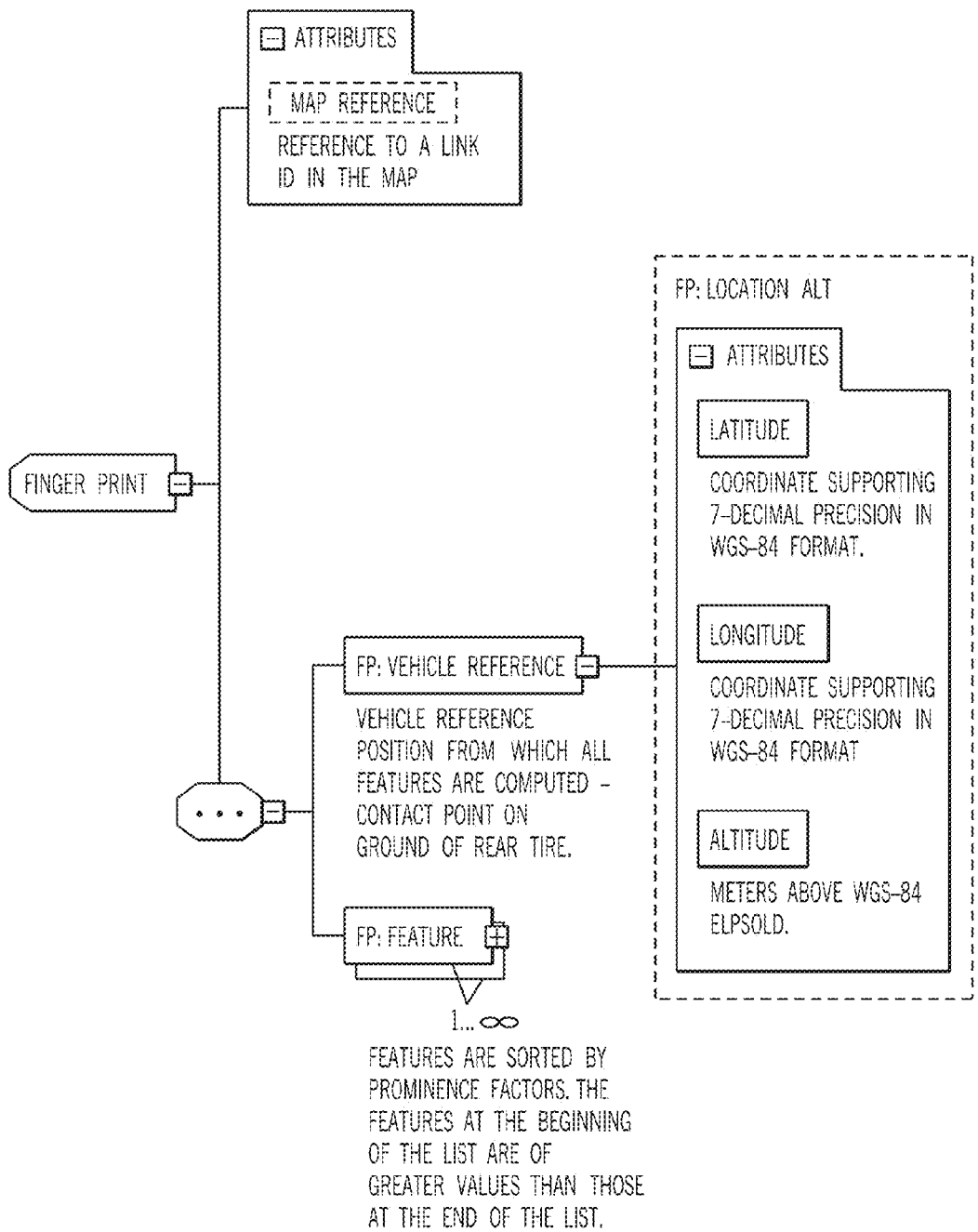
FIG. 2 illustrates an example of an encoded fingerprint in a fingerprint database.

FIGS. 2-5 depict an example of an encoding system for a fingerprint database. As shown in FIG. 2, each fingerprint encoded in the database contains a list of feature geometries (such as line features, arc features, and spline features). In certain embodiments, the fingerprint comprises includes a map reference attribute, which specifies the link in the reference map that corresponds to a vehicle reference where the fingerprint was derived. The map reference may comprise a link identifier and a longitudinal distance on the link.

Additionally, each fingerprint includes a vehicle reference that provides a three-dimensional reference point for a data collection device or vehicle during the localization process (described below). The reference point anchors all of the feature geometries extracted at the location, and facilitates the feature comparison process during localization to account for the difference in focal points between the data collection device (e.g., vehicle) and the vehicle capturing/extracting the data. The vehicle reference describes the latitude, longitude, and altitude locations from which the feature geometries were extracted (such as the location of the contact point on the ground of the rear tire at the time of extraction). The latitude, longitude, and altitude measurements may be described using the World Geodetic System (WGS), such as WGS 84.

Figure 3:
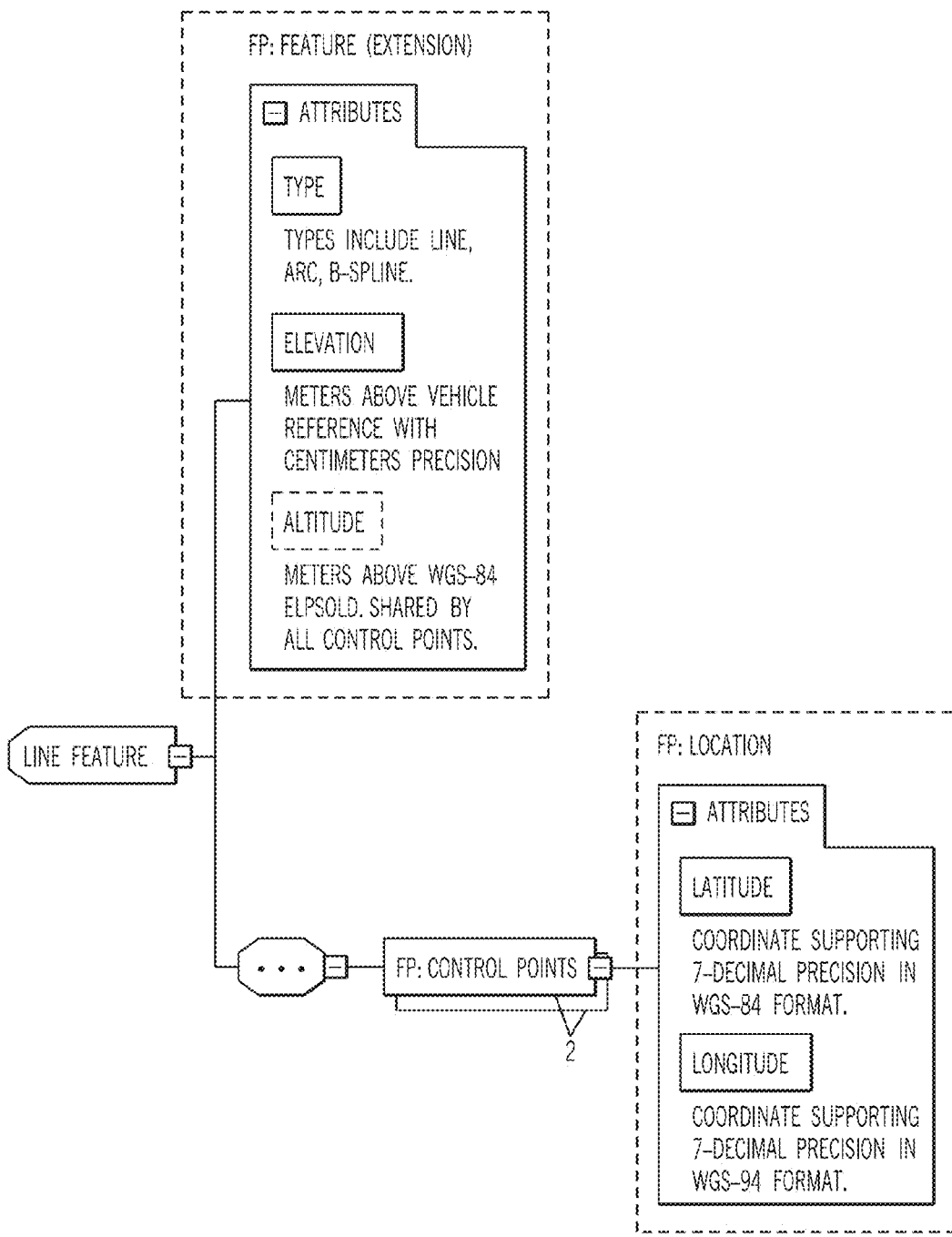
FIG. 3 illustrates an example of a line feature geometry of the encoded fingerprint of FIG. 2.
Figure 4:
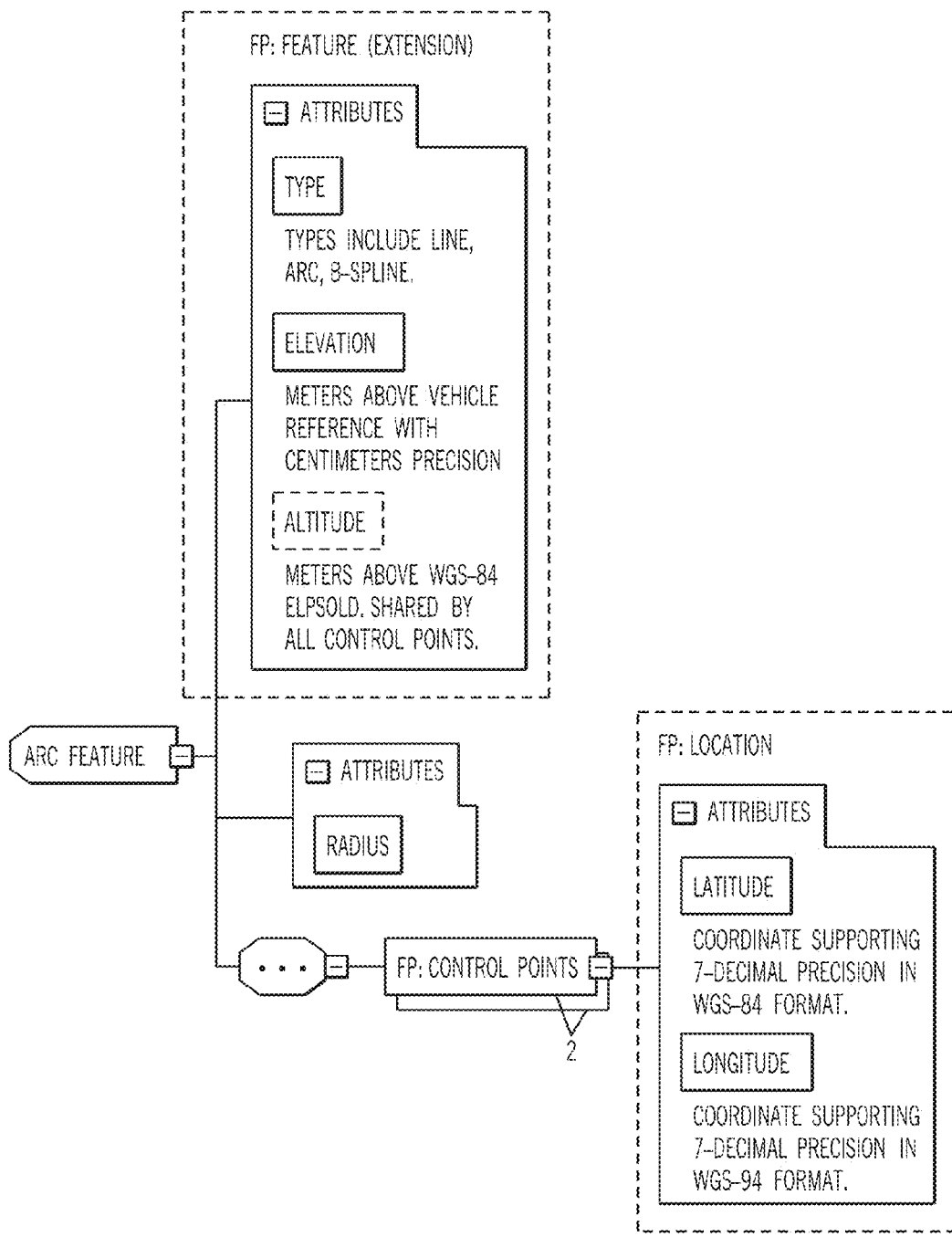
FIG. 4 illustrates an example of an arc feature geometry of the encoded fingerprint of FIG. 2.
Figure 5:
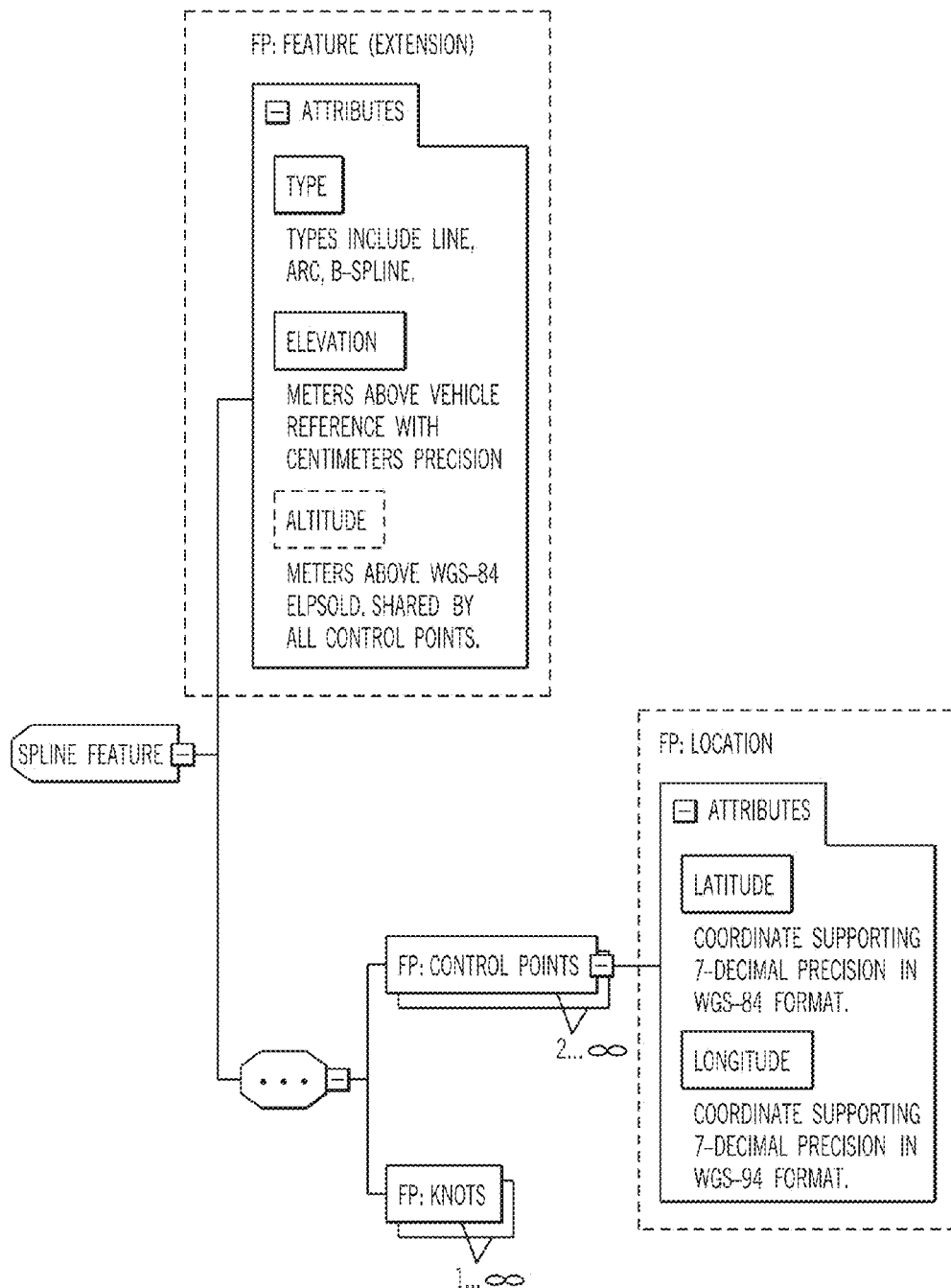
FIG. 5 illustrates an example of a spline feature geometry of the encoded fingerprint of FIG. 2.

Each fingerprint also includes a plurality of feature geometries, such as line features, arc features, and spline features (depicted in expanded detail in FIGS. 3-5). The feature geometries may be sorted or ranked in order of the prominence of the factors, wherein feature geometries at the top of the list have more prominent or identifiable features for the geographic location than features at bottom of the list. Methodologies for ranking feature geometries are described in detail below, and may be applied in the encoding of feature geometries in the fingerprint database as well. In certain embodiments, the list of feature geometries comprises at least 5, at least 10, or at least 15 different feature geometries for each location.

FIG. 3 depicts an encoded line feature in detail. As shown in the figure, the line feature represents the 2D line geometry with two control points (i.e., identifiable, extracted points on the 2D geometry). In one embodiment, the two control points for a line may be the opposite ends of the line. The control points of the line share the same elevation and altitude since the points have been extracted on the same horizontal plane from the depth map. As such, the attributes for the line feature geometry include a universal value for both the elevation and the altitude. Elevation may be expressed in meters above the vehicle reference. The separate latitude and longitude for each control point is also encoded for the line feature geometry, and may be expressed in WGS 84 coordinates.

FIG. 4 depicts an encoded arc feature in detail. As shown in the figure, the arc feature represents the 2D arc geometry with two control points and a radius. In one embodiment, the two control points may be the opposite ends of the arc. The control points of the arc share the same elevation and altitude since the points have been extracted on the same horizontal plane from the depth map. As such, the attributes for the arc feature geometry include a universal value for both the elevation and the altitude. The separate latitude and longitude for each control point is also encoded for the arc feature geometry, and may be expressed in WGS 84 coordinates.

FIG. 5 depicts an encoded spline feature in detail. As shown in the figure, the spline feature represents the 2D spline geometry (e.g., a B-spline) with multiple control points and knots. The control points of the spline share the same elevation and altitude since the points have been extracted on the same horizontal plane from the depth map. As such, the attributes for the spline feature geometry include a universal value for both the elevation and the altitude. The separate latitude and longitude for each control point is also encoded for the spline feature geometry, and may be expressed in WGS 84 coordinates.

Determining an End-User Device Location Using Fingerprint Database

Using the established, encoded fingerprint database for the path network, an end-user device (e.g., vehicle, mobile phone, smart watch, etc.) equipped with depth sensing camera technology (e.g., a LIDAR camera) may be able to determine its location within the path network. The end-user device may determine its location based upon the device's own identification of feature geometries surrounding the end-user device/vehicle, and comparing certain feature geometries with the established fingerprint database (discussed above), wherein the location is determined based upon a matching of features or fingerprints to the database. In some embodiments, the device's location may be determined through a combination of identifying feature geometries and GPS data. In other embodiments, in the absence of any GPS data, the location of the device is determined solely through identification of the feature geometries.

The end-user device (e.g., vehicle, mobile phone, smart watch, etc.) equipped with the depth sensing device (e.g., LIDAR camera) may extract feature geometries in a similar manner described above for the data collection device in the construction of the fingerprint database to determine the location of the device. A number of extracted feature geometries may be selected to define a fingerprint, and the defined fingerprint may be matched to the fingerprint database to determine the location. In some embodiments, the end-user device may compute various parameters to orient the device's collected depth map with the fingerprint database before or in conjunction with the extraction process. This may assist in determining not only the end-user device's geographic location, but the orientation of the device at the location.

In an effort to identify the device's location in real-time, the determination of fingerprint for the device may be an abbreviated process (in comparison to construction of the fingerprint database), wherein only a handful of feature geometries are selected and compared with the fingerprint database. For instance, each geographic location may have several thousand feature geometries stored in the fingerprint database. In other words, it may be inefficient for the end-user device (e.g., vehicle) to analyze or consider all of the 2D feature geometries available for localization.

The geometries are selected based upon two main factors (described in greater detail below). The first factor is the ranking of the feature geometries, and the second factor is the geometric dilution of precision (GDOP) of the feature geometries. In certain embodiments, the localization process for a device in a path network comprises (1) identifying feature geometries surrounding the device, (2) determining the properties (e.g., shape, size, elevation, variance) and location (GDOP) of each feature geometry, (3) ranking the feature geometries according to their properties, and (4) selecting a fingerprint of feature geometries that are highly distributed (high GDOP) and have high ranking values.

Factor 1: GDOP of the Feature Geometries

The GDOP represents the geographic distribution of structures or feature geometries around the vehicle. In other words, the relationship between the location of one selected feature geometry from each additional feature geometry is a factor. In certain embodiments, the best or highest GDOP is provided by the most evenly distributed structures or feature geometries surrounding the device. In some embodiments, the best or highest GDOP is determined based on the distribution of the structures as plotted in an x-y plane (i.e., ignoring the elevation of each structure in the z-axis).

For example, if there are three structures surrounding the vehicle, the best GDOP may occur where the structures are separated or spaced 120 degrees apart from each other. In other words, the first structure may be located in the x-y plane at 0 degrees from the vehicle (e.g., as measured from the direction of travel or the direction of travel of the road), the second structure may be located at 120 degrees from the vehicle, and the third structure may be located at 240 degrees from the vehicle.

If there are four structures surrounding the vehicle, the best GDOP would occur where each structure is spaced 90 degrees apart from each other. If there are five structures, the best GDOP would occur where each structure is 72 degrees apart from each other, and so on.

Factor 2: Ranking of Feature Geometries

Regarding the second factor, the feature geometries (within each sector or within the overall depth map) may be compared or ranked based upon one or more of the following properties: (1) the shape of the feature, (2) the size of the feature, (3) the elevation of the feature, and (4) the variance (or invariance) of the feature (i.e., how much does the shape of the feature change over time, or whether the feature is present at all at certain times). In some embodiments, additional factors may be considered, such as the color of the feature geometry or fingerprint. Identification of color may require additional equipment attached or otherwise connected to the data collection or end-user device (e.g., vehicle), as a LIDAR camera does not identify color.

Figure 6:
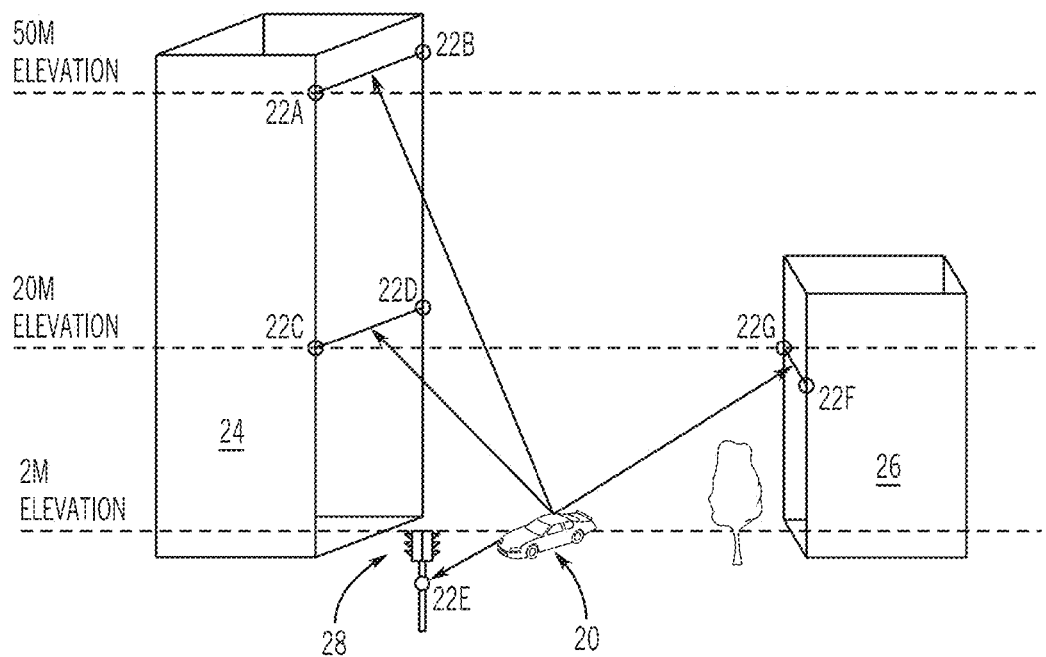
FIG. 6 illustrates an example of a vehicle identifying and extracting feature geometries surrounding the vehicle to determine the vehicle's geographic location.

Regarding shape properties, feature geometries with simplistic shapes such as lines, arcs, and splines may be ranked higher than other more complex shapes because the simplicity of the lines, arcs, and splines allow for more efficient processing. In other words, as depicted in FIG. 6, feature geometries representing straight lines on a building at 20 meters and 50 meters elevation may be simpler than feature geometries that capture branches of a tree. Therefore, feature geometries represented by the lines on the building may be ranked higher than feature geometries associated with the branches of the tree.

Regarding size properties, feature geometries that are larger in size may be ranked higher than feature geometries that are smaller in size. For example, in FIG. 6, the feature geometries on the left building at 20 meters and 50 meters would be ranked higher than the feature geometry on the right building at 20 meters.

Regarding elevation properties, feature geometries that are at higher elevations from the road level may be ranked higher than feature geometries at lower elevations from the road level. In other words, the height of a building may assist in identifying a particular location, and therefore higher elevation feature geometries for each location may be ranked higher. For example, in FIG. 6, the feature geometry at 50 meters elevation may be ranked higher than the feature geometries at 20 meters elevation. In certain embodiments, the location within the path network may be devoid of prominent features at higher elevations, where features at lower elevations are then selected. This may include trees or other seasonal features.

Regarding variance properties, feature geometries that are less variant are given high ranking. Variance of a feature geometry may take the seasonality of the feature into consideration. For example, in the fall or winter, tree leaves may disappear to expose bare branches to the LIDAR camera. The tree leaves may then reemerge in the spring or summer. Therefore, branches of trees, leaves, etc. are variant based upon the seasonality of the geometries, and therefore may be assigned less weight than more invariant feature geometries, such as a straight line of a building or the trunk of the tree. In some embodiments, multiple fingerprints may be stored in the fingerprint database to accurately represent variant features during different seasons. Variance of a feature geometry may also take into account whether the feature geometry is present at certain times and absent at other times (i.e., non-stationary objects). For example, a LIDAR camera mounted to a vehicle may identify another vehicle (such as a large truck) traveling along the road segment in an adjacent lane. This feature geometry may be given a very low ranking due to its non-stationary nature.

Regarding color properties, feature geometries that include bright or non-neutral colors (such as red, pink, purple, orange, green, blue, or yellow) may be given a higher rank than a neutral color (such as grey, black, brown, beige, or white). For example, a bright or non-neutral color in a city or metropolitan area may represent the color of a unique building or structure in contrast to the majority of steel construction present within the city or metropolitan area. Through the identification of such a unique building color, the device may be able to identify its location within the path network of the city much more easily.

In certain embodiments, the feature geometries are ranked based upon a combination of the properties discussed above. The combination may comprise a weighted approach, wherein each property is given a weight per location and time. In other words, the weight for each property may vary spatially and temporally (i.e., the weights may be dynamic).

In one embodiment, the overall ranking value for a particular feature geometry is calculated using the rank value of shape of the feature ("Shape"), the rank value of the size of the feature ("Size"), the rank value of the elevation of the feature ("Elevation"), and the rank value of the variance of the feature ("Variance"). The overall ranking value for each feature geometry may be calculated using the equation below:

$$\text{Ranking Value} = W1 \times \text{Shape} + W2 \times \text{Size} + W3 \times \text{Elevation} + W4 \times \text{Variance}$$

wherein $W1+W2+W3+W4=1$.

In certain embodiments, W1, W2, W3, and W4 have equal weights, indicating that the importance of each property is equal. In other embodiments, W2 (associated with the size of the feature geometry) and/or W3 (associated with the elevation of the geometry) are given the higher weight than W1 (shape) and/or W4 (variance). In certain embodiment, W2 is given the highest weight of the four factors. In other embodiments, W3 is given the highest weight of the four factors. In one particular embodiment, the order of weights, from highest to lowest is: W3, W2, W1, and W4.

In one example, four feature geometries are compared with each other based on the four factors. In this example, each factor is given the same weight ($W1=W2=W3=W4=0.25$). The factors are defined with Boolean values of true or false, wherein true=1 and false=0. True values may represent high ranking properties, such as a geometry with a size greater than 10 meters in length, an elevation greater than 10 meters from the road level, a shape that is a line, set of connected lines or curves, arc, or spline, or an invariant geometry. False values may represent low rank properties, such as a geometry with a size less than 10 meters in length, an elevation less than 10 meters from the road level, a shape that is more complex than a line, set of connected lines or curves, arc, or spline, or a variant geometry. The ranking value is determined for each feature, and an overall rank is determined based on the ranking values. The results of the prophetic example are shown in the table below.

TABLE

Ranking Feature Geometries

| Name | Shape | Size | Elevation | Variance | Ranking Value | Final Rank |
|---|---|---|---|---|---|---|
| Feature 1 | True | True | True | True | 1.0 | 1 |
| Feature 2 | False | True | False | False | 0.25 | 4 |
| Feature 3 | False | True | True | False | 0.50 | 3 |
| Feature 4 | True | True | False | True | 0.75 | 2 |

In other embodiments, the feature geometries may be ranked using numeric values in combination with, or alternatively from Boolean values. For example, values used to sort the features may include the actual length or size of each feature or the elevation of each feature from the road level, while the shape of each feature or the variance of each structure may be defined using a Boolean true or false characteristic.

Combination of GDOP and Feature Rankings

In certain embodiments, a fingerprint comprising multiple feature geometries may be through the combination of feature geometries from various positions or zones surrounding the vehicle. In some embodiments, the process comprises selecting feature geometries that are both highly distributed (i.e., have a high GDOP) and also have high ranking values. In certain embodiments, the process may comprise dividing a depth map into multiple sections or zones (e.g., at least 3, 4, or 5 sections or zones), wherein structures are identified in each section of the depth map and feature geometries within those structures are ranked against each other. In certain embodiments, each section or zone comprises an equal volume of the depth map. The overall fingerprint comprises selecting the highest ranking feature geometry within each section of the depth map. In some embodiments, to the extent no structure is identified within a section of the depth map, additional structures (i.e., more than one structure) or additional feature geometries within a single structure may be identified in a neighboring section.

In certain embodiments, the process selects the top number of feature geometries to be considered for determining the device's location. In some embodiments, the selection comprises at least 2, at least 3, at least 5, at least 10, or at least 15 feature geometries.

Determining Positioning in Path Network

Following the end-user device's or vehicle's selection of a fingerprint comprising a plurality of feature geometries, the device may transmit the fingerprint data to the fingerprint database over a connected network. The fingerprint database may then compare the transmitted feature geometries with its stored feature geometry data.

In the comparison process, based on the uniqueness of the feature geometries selected and transmitted, the database is able to match the selected and transmitted feature geometries with feature geometries stored in the fingerprint database. Through this matching process, the fingerprint database transmits location data of the feature geometries back to the device. This location data may include the encoded data of the feature geometries (discussed above), such as control point data for the feature geometries. In other words, transmission of the encoded data for a control point includes the transmission of the latitude, longitude, and altitude of the control point.

Using the transmitted control point data, and knowing the device's measured distance from each control point, the geographic location of the device may be determined. Additionally, in some embodiments, the device's geographic orientation (e.g., direction of travel) may be determined. That is, when matching feature geometries, and knowing the positioning of the feature geometries relative to the depth sensing device's positioning, an orientation may be determined that best aligns the feature geometries to indicate the device's and depth sensing device's orientation (e.g. heading).

In certain embodiments, the geographic location is determined through a multilateration process, using the transmitted control point data and measured distances from the control points (i.e., the radii from the control points).

In certain embodiments, the geographic location of the device is determined through the multilateration process with at least 3 control points (and the associated latitude, longitude, and altitude data associated with each control point). In other embodiments, at least 4 control points are used. In yet other embodiments, 5 or more control points are used to calculate the geographic location of the car. In alternative embodiments, only 2 control points may be used in conjunction with GPS data to determine the geographic location of the end-user device or vehicle.

The geographic location of the device may be calculated within 1 meter of its ground truth or true location (i.e., the actual latitude/longitude, and optionally, altitude, coordinates for the device). In some embodiments, the geographic location may be calculated within 0.5 meters, 0.1 meters, 50 centimeters, 20 centimeters, 10 centimeters, 5 centimeters, 3 centimeters, 2 centimeters, or 1 centimeter of the ground truth or true location.

FIG. 6 provides one non-limiting example of the multilateration process. In this example, a vehicle 20 (i.e., a processor of the vehicle) has identified and selected four feature geometries surrounding the vehicle to represent a fingerprint for the location. That is, the vehicle 20 has identified and selected two straight line feature geometries on a first building 24, the feature geometries appearing at 20 meters and 50 meters elevation above the road level. The vehicle 20 has also identified and selected an additional straight line feature geometry appearing on a second building 26 at 20 meters elevation. Additionally, the vehicle 20 has identified and selected a feature geometry for a traffic light pole 28 at 2 meters elevation.

After transmitting and matching these feature geometries with the fingerprint database, the fingerprint database has returned control point data for each of these geometries. For example, as shown in FIG. 6, the control points are identified as the end points of the straight lines 22a, 22b, 22c, 22d, 22f, and 22g, as well as a single point 22e representing the traffic light pole. Each of the control points 22a-22g includes latitude, longitude, and altitude information. In conjunction with identified distances between the vehicle 20 and each control point, this control point information may be used to determine the location of the vehicle 20 through a multilateration calculation.

Figure 7A:
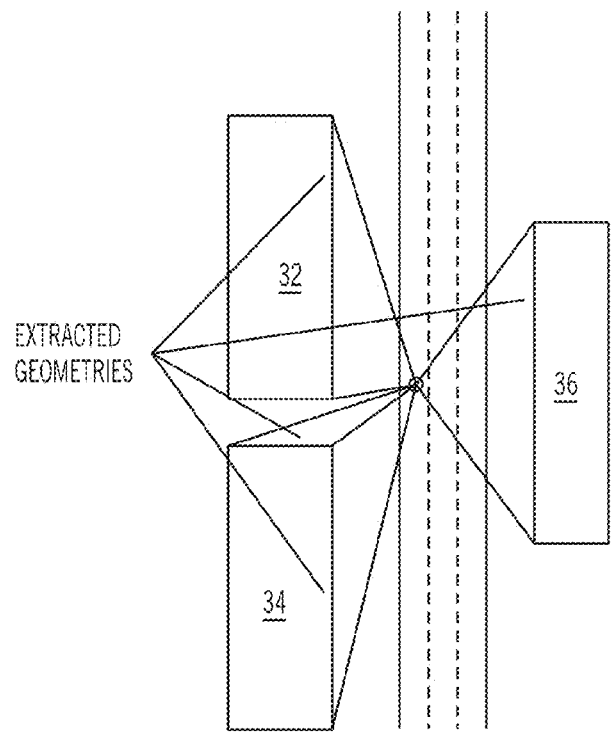
FIGS. 7a and 7b illustrate an additional example of a device identifying and extracting feature geometries and control points surrounding the device to determine the device's geographic location.
Figure 7B:
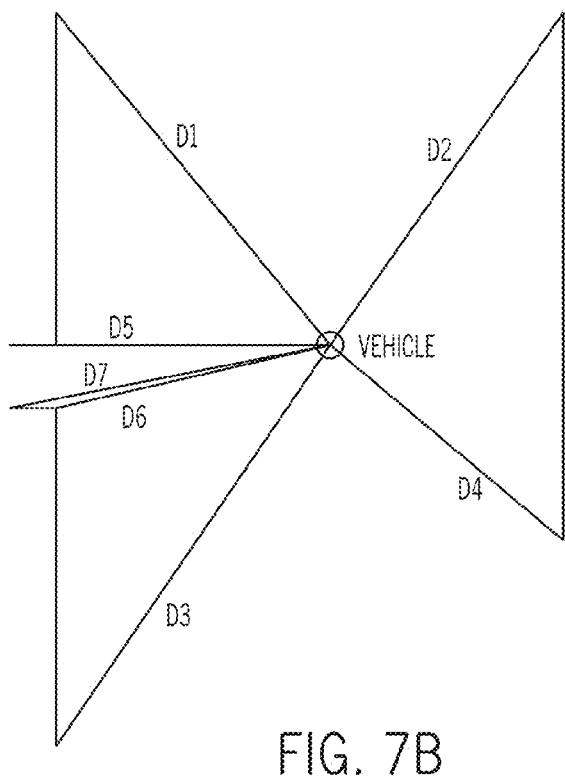

FIGS. 7a and 7b provide another example of this process, wherein a vehicle's location is determined through the extraction of feature geometries, matching of geometries with a fingerprint database, and multilateration process. For example, in FIG. 7a, four straight line features are extracted from three buildings 32, 34, and 36 around the vehicle. Through a matching process with the fingerprint database, control point information for the feature geometries is relayed back to the vehicle for processing. As shown in FIG. 7b, these four straight line features contain seven control points, wherein d1-d7 depict the identified distance from the vehicle to each control point. Using these distances and the control point information (e.g., the latitude, longitude, and altitude), the geographic location of the vehicle is determined.

Figure 8:
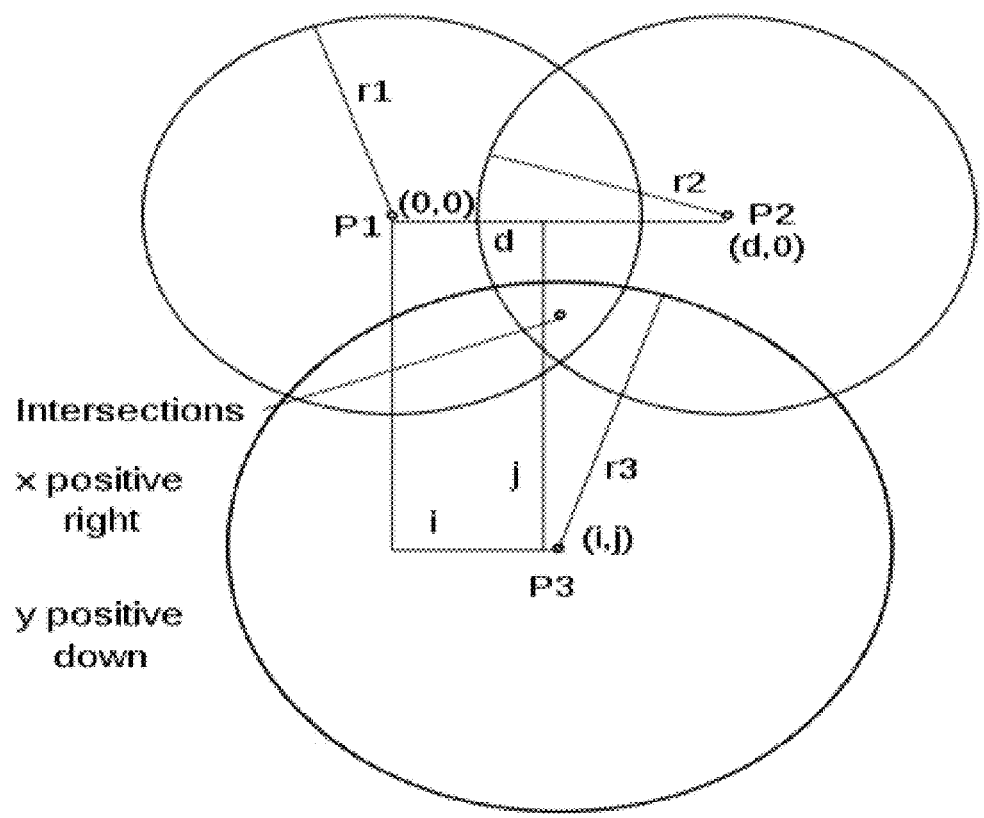
FIG. 8 illustrates another example of a multilateration process based on three control points.

FIG. 8 provides another example of a multilateration process based on three control points P1, P2, P3. The geographic coordinates for the three control points are identified as (0,0), (d,0), and (i,j). The distances from the vehicle to the control points are identified by radii r1, r2, r3. Based on these known distances, and the geographic locations of the control points from the fingerprint database, the vehicle's approximate geographic location is calculated. For example, in this case, the x, y, and z coordinates for the location of the vehicle may be calculated using the following equations:

$$x = \frac{r_1^2 - r_2^2 + d^2}{2d}.$$

$$y = \frac{r_1^2 - r_2^2 - x^2 + (x-i)^2 + j^2}{2j} = \frac{r_1^2 - r_2^2 + i^2 + j^2}{2j} - \frac{i}{j}x.$$

$$z = \pm\sqrt{r_1^2 - x^2 - y^2}.$$

As depicted in FIG. 8, the approximate location is within the intersection of the three spheres.

In some embodiments, such as in cases of autonomous or HAD vehicles, following the processing and determination of a vehicle's geographic location or orientation, the vehicle may process the reported data and make a decision on whether to alert the operator or take action. In certain embodiments, a navigation device in the vehicle or another computer system in communication with the navigation device may include instructions for routing the vehicle or generate driving commands for steering the vehicle, shifting gears, increasing and decreasing the throttle, and braking based on the reported location or orientation data.

Flowchart Embodiments

Figure 9:
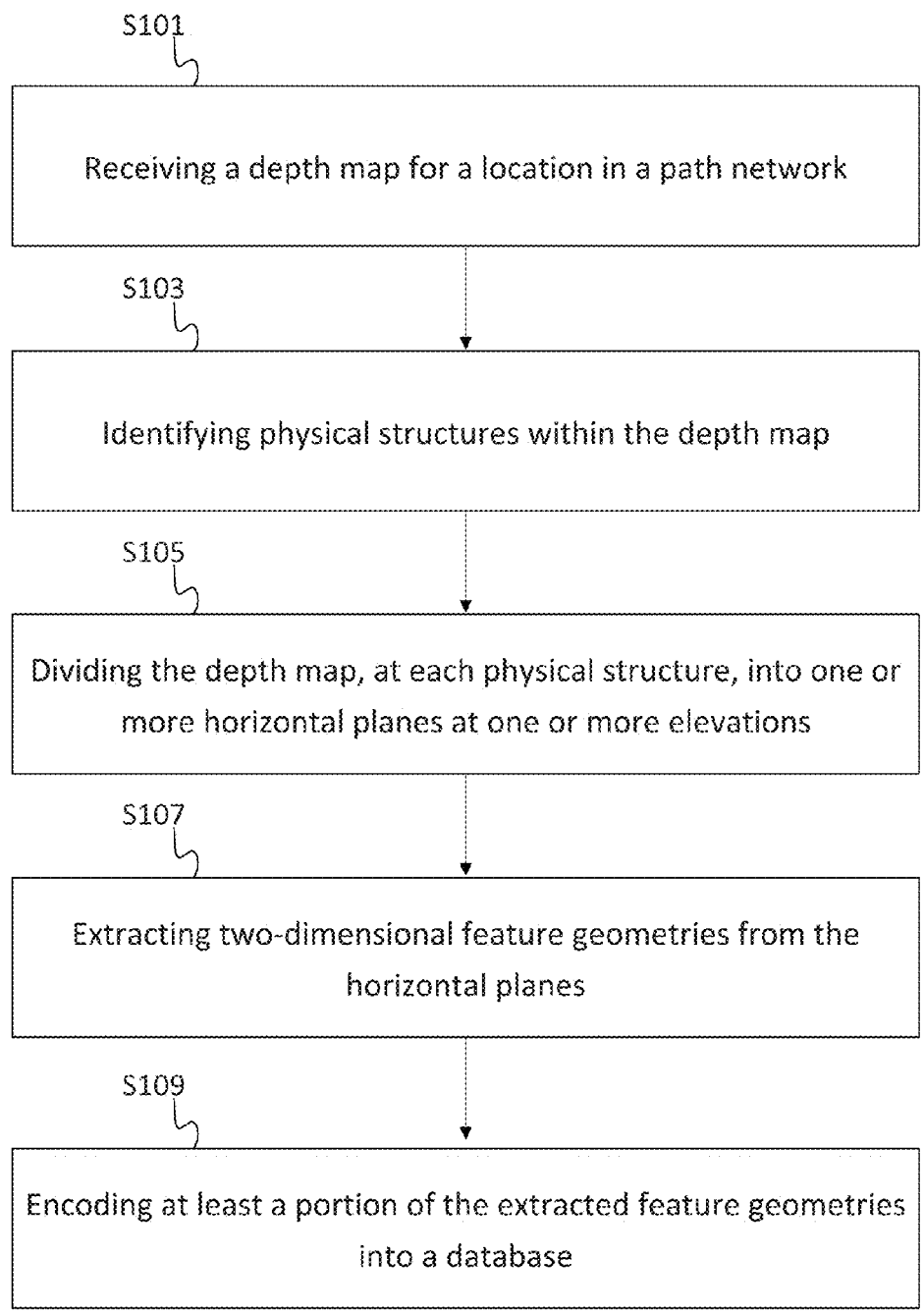
FIG. 9 illustrates an example flowchart for developing a fingerprint database.

FIG. 9 illustrates an example flowchart for developing a fingerprint database for a path network. The process of the flowchart may be performed by the navigation data system 100 or device 201 described and shown in FIGS. 11 and 12. Alternatively, another device may be configured to perform one or more of the following acts. Additional, fewer, or different acts may be included.

At act S101, a depth map is received for a location in the path network. Depth maps may be collected using depth sensing devices such as a LIDAR camera. The depth map may be saved or transmitted over a connected network to a processor for further analysis.

At act S103, physical structures within the depth map are identified using a processor, either attached to the data collection device (e.g., vehicle) collecting the depth map data or a separate processor associated with an external map database. Examples of physical structures include building facades, road signs, polls, plants (e.g., trees), or other non-transitory structures existing in the path network.

At act S105, for each physical structure, the depth map may be divided into one or more horizontal planes or slices at one or more elevations from the road level. In the dividing or slicing process, the depth map data is identified at a defined, selected elevation, as well as data that exists within a range above and below the selected elevation. For example, the horizontal plane may include an aggregation of data within 0.1 meters, 0.2 meters, 0.5 meters, 1 meter, or 2 meters of the defined elevation.

At act S107, two-dimensional feature geometries are extracted from the horizontal planes. Extraction of geometries for each horizontal slice or plane may be conducted using various algorithms, wherein the depth map data in the slice is converted into one or more two-dimensional geometries.

At act S109, at least a portion of the extracted feature geometries are encoded into the fingerprint database. In some embodiments, only high ranking feature geometries are encoded or saved in the database.

Figure 10:
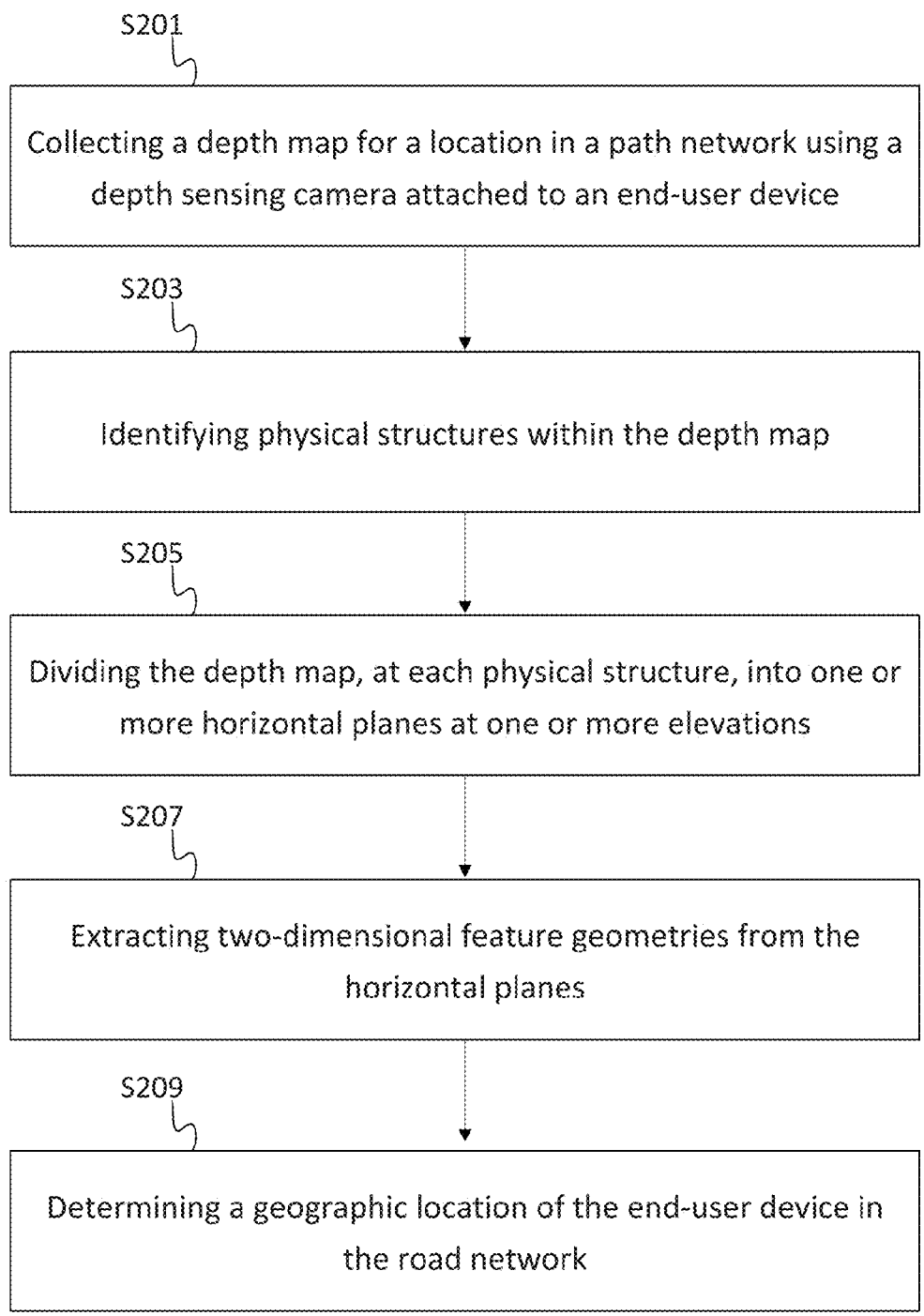
FIG. 10 illustrates an example flowchart for determining a location of a device in a path network.

FIG. 10 illustrates an example flowchart for determining a geographic location of a vehicle. The process of the flowchart may be performed by the navigation data system 100 or device 201 described and shown in FIGS. 11 and 12. Alternatively, another device may be configured to perform one or more of the following acts. Additional, fewer, or different acts may be included.

At act S201, a depth map is collected at a location in the path network using a depth sensing camera attached to an end-user device. At act S203, physical structures within the depth map are identified using a processor of the end-user device. At act S205, for each physical structure, the depth map may be divided into one or more horizontal planes or slices at one or more elevations from the road level. At act S207, two-dimensional feature geometries are extracted from the horizontal planes.

At act S209, a geographic location of the end-user device in the path network is determined. The location is determined through a comparison of at least a portion of the extracted feature geometries and a database of feature geometries of the path network. In some embodiments, only high ranking feature geometries are selected for comparison with the database. In some embodiments, the orientation of the device at the geographic location is also determined.

Navigation and Network System

Figure 11:
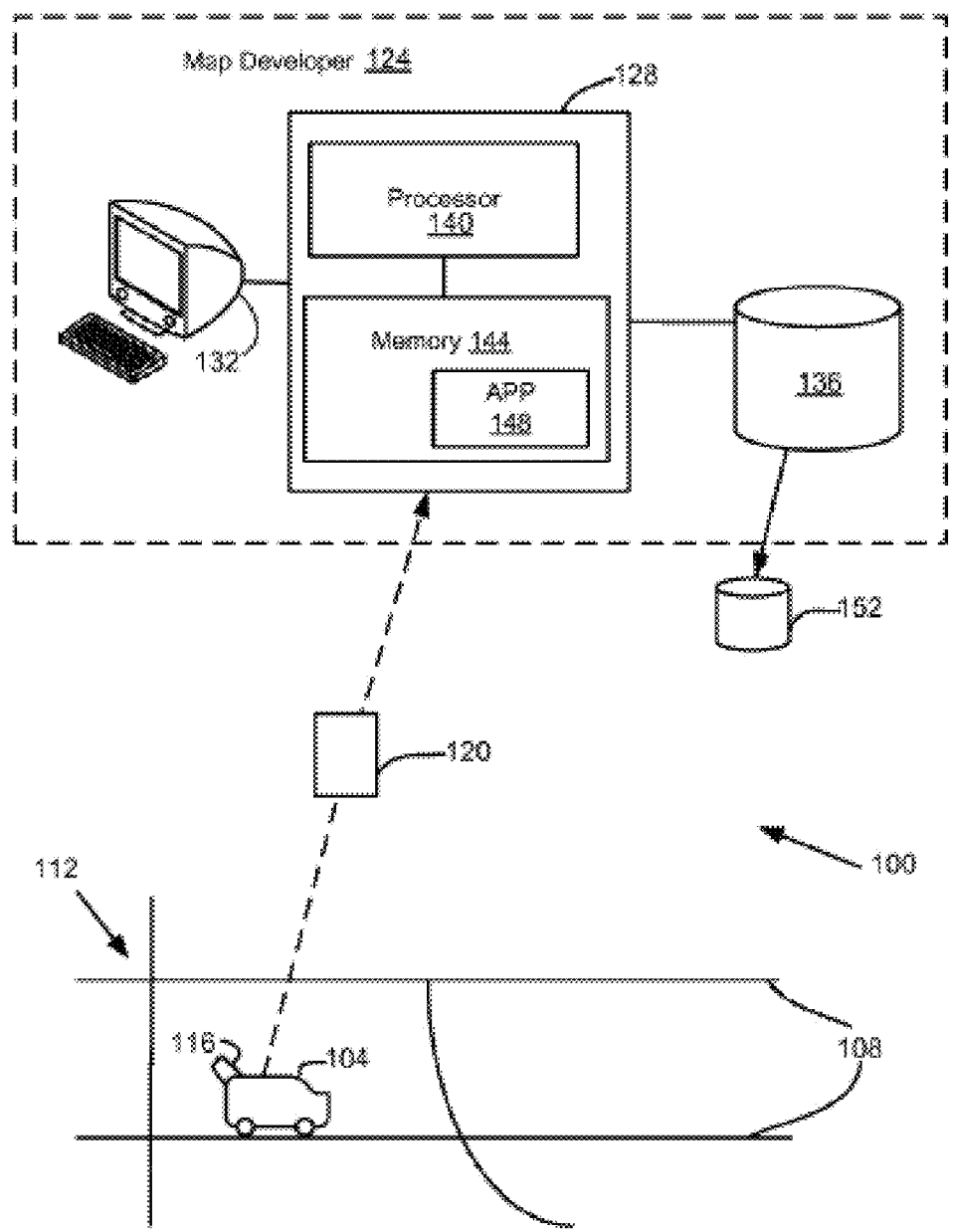
FIG. 11 is a diagram of an exemplary geographic and/or navigation data system.

FIG. 11 depicts one embodiment of a geographic and/or navigation data system 100 useful for collecting depth map data or determining a device's location in a path network. The geographic data or navigation system 100 includes, but is not limited to, a data collection or end-user device 104 travelling on a path network 108 in a geographic region 112, a device 116, a processing device 128, a workstation or computer 132, and/or a database 136. Additional, fewer, or different components may be provided. For example, a proxy server, a name server, a map server, a cache server or cache network, a router, a switch or intelligent switch, additional computers or workstations, a user interface, administrative components, such as an administrative workstation, a gateway device, a backbone, ports, network connections, and/or network interfaces may be provided. While the components in FIG. 11 are shown as separate from one another, one or more of these components may be combined.

The data collection or end-user device 104 is a vehicle, such as a car, truck, motorcycle, bicycle, Segway, or other transportation device or mechanical device used to move on the path network 108. Alternatively, the data collection or end-user device 104 may represent a pedestrian, such as a human being or animal, that walks or moves along the path network 108. The path network 108 is a road network and/or a collection of other pathways. For example, the path network 108 is a road network made up of various roads. The roads may be used to drive vehicles on, such as local and neighborhood streets as well as highways. Also, instead of or in addition to traditional streets, the path network 108 may include bicycle roads or paths, walking paths, or other travel paths. Alternatively, the path network 108 may be an open area space with no specific paths or travel constraints. The path network 108 is in the geographic region 112, such as a city, a suburb, a state, a country, and/or other geographic region.

In certain embodiments, the data collection or end-user device 104 is an autonomous vehicle or a highly automated driving (HAD) vehicle. As described herein, an "autonomous vehicle" may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes.

As described herein, a "highly automated driving (HAD) vehicle" may refer to a vehicle that does not completely replace the human operator. Instead, in a highly automated driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible.

The data collection or end-user device 104 travels along or moves about the path network 108 to collect data. A supporting device or housing 116 is attached or connected with or carried by the device 104. The supporting housing 116 may be or may include equipment to collect data representing an area about or around a road or path or other area. For example, the collected data may be laser, LIDAR, imagery, and/or video/camera data (such as in the visible spectrum or other spectrum). Other data such as location data, GPS data, and/or other geographic data may be collected.

In one embodiment, the supporting housing 116 is a housing or container that is attached to or carried by a pedestrian (the data collection or end-user device 104), and as the pedestrian is on and/or moving on a path, sidewalk, or other area, equipment, such as a LIDAR system and/or camera, in the supporting housing 116 collects data. In another embodiment, the supporting housing 116 is a housing or container that is attached to a vehicle and, as the vehicle is on and/or moving on a road or path, equipment, such as a LIDAR device and/or camera, in the supporting housing 116 collects or gathers data corresponding to the surrounding area. Alternatively, the supporting housing 116 may be the LIDAR device or camera device itself or parts thereof. The supporting housing 116 may be positioned at a backend of a device (e.g., vehicle) and may be angled to enhance collection. In other embodiments, the supporting housing 116 may be positioned any place on a vehicle, pedestrian, or device and in any direction.

The collected data is stored on one or more non-transitory computer-readable media 120, such as a CD-ROM, DVD, flash drive, hard drive, or other tangible media suitable to store data. Different types of data may be stored on the same medium 120. Alternatively, separate non-transitory media 120 may be used to store separate or different types of data. In one embodiment, LIDAR or laser data, photographs (such as digital or electronic photographs), video images, and/or other image data collected by the device 104 and/or the supporting housing 116 are stored in one or more non-transitory media 120. Alternatively, the non-transitory media 120 may be signals carrying or having data. The collected LIDAR or image data may represent areas or regions about or around a path, road, or other area. The collected laser or LIDAR data and/or images may include geographic features, such as sky features, terrain or surrounding features, roads or paths (such as sidewalks), road or path markings (such as cross-walks or lane markings), road or path signs, points-of-interest ("POIs") such as buildings, parks, museums, etc., and/or other features or objects.

The collected data, via one or more non-transitory media 120, is sent to a map, geographic, and/or navigation data developer 124, such as HERE or Nokia Corporation. For example, a non-transitory medium 120 may be mailed to or brought to the map developer 124. Alternatively, some or all of the collected data may be transmitted to the map developer 124 via a wireless and/or wired network. For example, the network may include the Internet, an intranet, a local area network ("LAN"), a wide area network ("WAN"), a virtual private network ("VPN"), a server network, a cellular network, a satellite network, a broadcasting network, a wireless or wired connection, and/or any known or future network or connection. The term "map developer" may also include third-party contractors.

The processing device 128 maintained by the map developer 124 receives the collected data. The processing device 128 is one or more servers, computers (such as a desktop tower or a laptop processing unit), processors, and/or other electronic processing systems or devices. The processing device 128 includes, but is not limited to, a processor 140, a memory 144, and an image software application 148. Additional, fewer, or different components may be provided.

The processing device 128 may include or be in communication with the workstation or computer 132. For example, the workstation 132 is a user interface, electronic console, and/or computer with one or more input devices that may be used to access, control, and/or communicate with the processing device 128 or components thereof.

The processor 140 is a general processor, application-specific integrated circuit ("ASIC"), digital signal processor, field programmable gate array ("FPGA"), digital circuit, analog circuit, or combination thereof. In one embodiment, the processor 140 is one or more processors operable to control and/or communicate with the various electronics and logic of the processing device 128. The memory 144 is any known or future storage device. The memory 144 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 144 may be part of the processor 140. The memory 144 is operable or configured to store laser, LIDAR, and/or image data or other data.

The processor 140 or other processor is configured or adapted to execute the image software application 148, which may be stored in the memory 144 or other memory. For example, the image software application 148 generates a multi-layered image (such as a two-dimensional scalable vector graphics ("SVG") multi-layered image) based on model data, such as three-dimensional model data corresponding to a geographic area. In one embodiment, the application 148 identifies and/or receives three-dimensional model data, such as collected three-dimensional LIDAR point cloud data, and performs processes or rendering sequences, which are discussed in detail below, to generate a multi-layered graphics image of a geographic area. The generated multi-layered graphics image may be used in navigation or geographic systems as well as in a variety of user interfaces, devices, or systems. Also, the generated multi-layered graphics image may be provided to developers of such systems and/or devices for configuration purposes.

In one embodiment, one or more generated multi-layered graphics images are stored, linked, indexed, and/or associated with or in the database 136, which is in communication with the processing device 128. Alternatively, one or more generated multi-layered graphics images are stored in one or more separate or different databases that may or may not be associated with the database 136 or data thereof. In one embodiment, the geographic database 136 includes data used for navigation-related and/or geographic-related services. For example, the geographic database 136 contains road segment/link and node data records that represent a road network, such as the path network 108. A node represents an end point of a road segment and/or intersection points. The road segments and nodes may be associated with attributes, such as geographic coordinates, street names, address ranges, speed limits, turn restrictions at intersections, and other vehicle navigation attributes, as well as POIs, such as gasoline stations, hotels, restaurants, museums, stadiums, offices, automobile dealerships, auto repair shops, buildings, stores, etc. Alternatively, the geographic database 136 contains path segment/link and node data records or other data that represent pedestrian paths in addition to or instead of the vehicle road record data.

The geographic database 136 may be a master geographic database that is stored in a format that facilitates updating, maintenance, and development. For example, the master geographic database 136 or data in the master geographic database 136 is in an Oracle spatial format, such as for development or production purposes. The Oracle spatial format or development/production database may be compiled into a delivery format, such as a GDF format.

The data in the production and/or delivery formats may be compiled or further compiled to form geographic database products or databases 152, which may be used in end user navigation devices or systems or other systems or devices. For example, a customer of the map developer 124 (such as a developer of navigation devices or systems) may receive generated multi-layered graphics images as well as other geographic data in a delivery format and then compile and/or configure such data for end user devices. In one embodiment, geographic data is compiled (such as into a PSF format) to organize and/or configure the data (e.g., segment/link, node, multi-layered graphics image, and/or other data or attributes) for performing navigation-related functions and/or services such as route calculation, route guidance, map display, speed calculation, distance and travel time functions, and other functions, by a navigation device. The navigation-related functions may correspond to vehicle navigation, pedestrian navigation, or other types of navigation.

Figure 12:
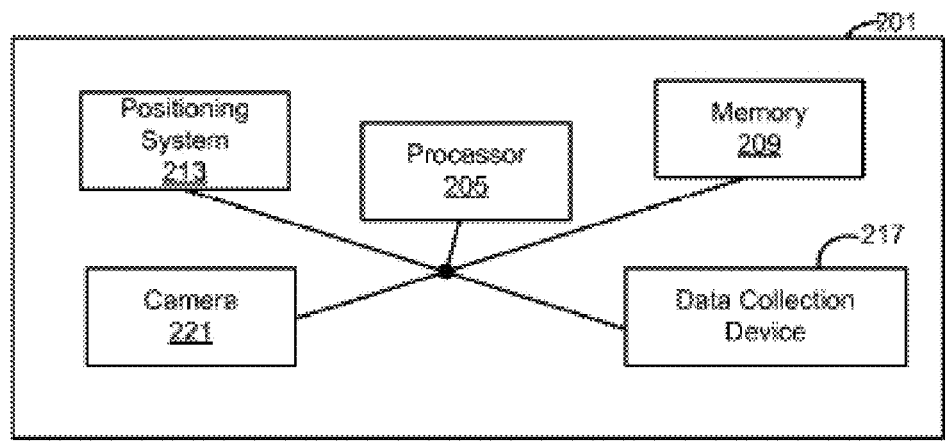
FIG. 12 illustrates an embodiment of components of a device used in the exemplary system of FIG. 11.

FIG. 12 illustrates an embodiment of components of a device 201. For example, the device 201 may be an embodiment of the data collection or end-user device 104, such as a vehicle, or may be similar to the supporting device 116. In one embodiment, the device 201 is a support or housing that includes equipment to collect data. For example, the device 201 is removably or integrally attached or connected with a vehicle. The device 201 is positioned at a top backend of the vehicle. Alternatively, the device 201 may be positioned on or in any part of the vehicle at any angle. In another embodiment, the device 201 is attached to or carried by a pedestrian. For example, the device 201 may be a LIDAR device or other device for collecting three-dimensional data.

The device 201 includes, but is not limited to, a processor 205, a memory 209, a positioning system 213, a data collection or end-user device 217, and a camera or camera device 221. Additional, fewer, or different components may be provided. For example, an input device may be provided. The input device may be one or more buttons, keypad, keyboard, mouse, stylist pen, trackball, rocker switch, touch pad, voice recognition circuit, or other device or component for controlling or inputting data in one or more of the components of the device 201. While the components in FIG. 12 are shown as separate from one another, one or more of these components may be combined. Also, some of the components may be provided outside of the device 201. For example, if the device 201 is a housing attached to a vehicle, the positioning system 213, the processor 205, the memory 209, an input device, and/or other components may be in the vehicle or on another part of the vehicle while the data collection or end-user device 217 and the camera 221 are in the device 201. The data collection or end-user device 217 and the camera 221 may also be separated into different enclosures or supports.

The processor 205 is similar to or different than the processor 140. The processor 205 is configured to operate the collection equipment, such as the positioning system 213, the data collection or end-user device 217, and the camera system 221. For example, the processor 205 sends commands to the various collection devices to collect data and synchronizes or manages the different components. Also, the processor 205 is configured to store data from the collection devices into the memory 209. The memory 209 is similar to or different than the memory 144. The memory 209 is operable or configured to store collected light, laser, LIDAR, image, and/or position data or other data. The memory 209 may be part of the non-transitory computer-readable medium 120 or may be a separate memory.

The positioning system 213 is a GPS system, one or more mechanical and/or electrical sensors, one or more gyroscopes, a local positioning system, one or more direction sensors, or other system or device for providing position data, such as location data (e.g., longitude, latitude, and/or altitude) and/or direction data, of the device 201, components thereof, or an attached device, such as a vehicle.

The camera 221 is one or more cameras used for taking pictures or videos of a surrounding area. For example, the camera system 221 includes a video camera that records video data (such as in the visible light spectrum) representing geographic features of and about a road or path as a vehicle drives along the road or path. The camera 221 may also capture still photographs separate from the video data. The camera 221 is able to capture different colors and associated text of geographic features.

The data collection or end-user device 217 comprises a light data collection device. For example the device or system 217 may include a light source and a light receiver. In one embodiment, the data collection or end-user device 217 comprises a LIDAR device or sensor, a laser device, and/or other device that collects data points, such as three-dimensional data, by transmitting and receiving light.

In the above described embodiments, the communication network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatuses can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatuses and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A method comprising:
   receiving a three-dimensional depth map for a location in a path network using a depth sensing device;
   identifying, using a processor, data indicative of physical structures within the depth map;
   dividing the depth map, at each physical structure, into one or more horizontal slices corresponding to one or more elevations from a road level, each horizontal slice having a thickness range associated with the respective elevation and including data from the depth map in the thickness range above and below the respective elevation;
   identifying data points of the one or more horizontal slices representing feature geometries of the physical structures;
   extracting two-dimensional feature geometries from the identified data points;
   encoding portions of the extracted feature geometries into a database; and
   providing the encoded portions of the extracted feature geometries for determination of a current geographic location of a vehicle.

2. The method of claim 1, wherein the depth sensing device is selected from the group consisting of: a LIDAR camera, a RADAR device, an ultrasound device, a structure light camera, and a moving mono-camera.

3. The method of claim 1, wherein the one or more horizontal slices have a thickness of 0.1-2 meters.

4. The method of claim 1, wherein the two-dimensional feature geometries comprise lines, arcs, or splines.

5. The method of claim 1, further comprising:
   ranking the extracted feature geometries to provide a ranking value for each extracted feature geometry, wherein the ranking is based on one or more of the following factors: (1) shape of the feature geometries, (2) a size of the feature geometries, (3) an elevation of the feature geometries, or (4) variance of the feature geometries; and
   sorting the ranked feature geometries from highest to lowest ranked feature geometries,
   wherein the portion of extracted feature geometries encoded in the database correlate with the highest ranked feature geometries.

6. The method of claim 1,
   wherein the encoding of the portion of the feature geometries comprises storing geographic attributes of selected control points of the feature geometries,
   wherein the geographic attributes comprise, for each selected control point, a latitude, a longitude, and an elevation above the road level.

7. A method comprising:
   collecting a three-dimensional depth map at a location in a path network using a depth sensing camera attached to an end-user device;
   dividing, using a processor, the depth map into one or more horizontal slices, each horizontal slice at a defined elevation from a road level and having a thickness in a range above and below the defined elevation, wherein each horizontal slice includes data from the depth map within a range above and below each respective elevation;
   extracting two-dimensional feature geometries comprising one or more sets of connected lines from the one or more horizontal slices;
   determining a geographic location of the end-user device through a comparison of at least a portion of the extracted feature geometries and a database of feature geometries for the path network; and
   providing the geographic location to the end-user device.

8. The method in claim 7, further comprising:
   ascertaining a geographic orientation of the end-user device through a comparison of the extracted feature geometries and the database of feature geometries.

9. The method of claim 7, wherein the end-user device is a vehicle, and wherein the depth sensing camera is selected from the group consisting of: a LIDAR camera, a RADAR device, an ultrasound device, a structure light camera, and a moving mono-camera.

10. The method of claim 7, further comprising:
    ranking the extracted feature geometries to provide a ranking value for each extracted feature geometry, wherein the ranking is based on one or more of the following factors: (1) shape of the feature geometries, (2) a size of the feature geometries, (3) an elevation of the feature geometries, or (4) variance of the feature geometries; and
    sorting the ranked feature geometries from highest to lowest ranked feature geometries,
    wherein the portion of extracted feature geometries used in the comparison with the database comprise the highest ranked feature geometries.

11. The method of claim 7, wherein the two-dimensional feature geometries comprise lines, arcs, or splines.

12. The method of claim 7, wherein the geographic location of the device is determined using (1) geographic attributes of selected control points of the feature geometries in the database and (2) a determined distance of the device from each selected control point of the feature geometries, wherein the geographic attributes comprise, for each selected control point, a latitude, a longitude, and an elevation above the road level.

13. An apparatus comprising:

at least one processor; and at least one memory including computer program code for one or more programs; the at least one memory and the computer program code configured to, with the at least one processor, cause the apparatus to at least perform:

receive a three-dimensional depth map for a location in a path network from a depth sensing device;

identify physical structures within the depth map at the location;

divide the depth map into one or more horizontal slices, each of the one or more horizontal slices at a defined elevation from a road level and having a thickness in a range above and below the defined elevation, wherein each horizontal slice includes data from the depth map at the defined elevation and includes data from the depth map in the range above and below the defined elevation, until at least one feature geometry of a physical structure is identified;

extract at least one two-dimensional feature geometry from the one or more horizontal slices; and encode at least a portion of the extracted at least one feature geometry into a database.

14. The apparatus of claim 13, wherein the depth sensing device is selected from the group consisting of: a LIDAR camera, a RADAR device, an ultrasound device, a structure light camera, and a moving mono-camera.

15. The apparatus of claim 13, wherein the at least one memory and the computer program code are configured to cause the apparatus to further perform:

rank extracted feature geometries to provide a ranking value for each extracted feature geometry, wherein the ranking is based on one or more of the following factors: (1) shape of the feature geometries, (2) a size of the feature geometries, (3) an elevation of the feature geometries, or (4) variance of the feature geometries; and sort the ranked feature geometries from highest to lowest ranked feature geometries, wherein the portion of extracted feature geometries encoded in the database correlate with the highest ranked feature geometries.

16. The apparatus of claim 13, wherein the encoding of the portion of the at least one feature geometry comprises storing geographic attributes of selected control points of the at least one feature geometry, wherein the geographic attributes comprise, for each selected control point, a latitude, a longitude, and an elevation above the road level.

17. An apparatus comprising:

at least one processor; and at least one memory including computer program code for one or more programs; the at least one memory and the computer program code configured to, with the at least one processor, cause the apparatus to at least perform:

collect a three-dimensional depth map at a location in a path network using a depth sensing camera attached to an end-user device;

identify physical structures within the depth map at the location;

divide the depth map, at each physical structure, into one or more horizontal slices, each of the one or more horizontal slices at a defined elevation from a road level and having a thickness in a range above and below the defined elevation, wherein the one or more horizontal slices include data from the depth map at the defined elevation and include data from the depth map in the range above and below the defined elevation;

extract two-dimensional feature geometries comprising one or more sets of connected lines from the ones or more horizontal slices;

determine a geographic location of the end-user device through a comparison of at least a portion of the extracted feature geometries and a database of feature geometries for the path network; and provide the geographic location of the end-user device to the end-user device.

18. The apparatus of claim 17, wherein the at least one memory and the computer program code are configured to cause the apparatus to further perform:

ascertain a geographic orientation of the end-user device through a comparison of the extracted feature geometries and the database of feature geometries.

19. The apparatus of claim 17, wherein the at least one memory and the computer program code are configured to cause the apparatus to further perform:

rank the extracted feature geometries to provide a ranking value for each extracted feature geometry, wherein the ranking is based on one or more of the following factors: (1) shape of the feature geometries, (2) a size of the feature geometries, (3) an elevation of the feature geometries, or (4) variance of the feature geometries; and sort the ranked feature geometries from highest to lowest ranked feature geometries, wherein the portion of extracted feature geometries used in the comparison with the database comprise the highest ranked feature geometries.

20. The apparatus of claim 17, wherein the geographic location of the end-user device is determined using (1) geographic attributes of selected control points of the feature geometries in the database and (2) a determined distance of the end-user device from each selected control point of the feature geometries, wherein the geographic attributes comprise, for each selected control point, a latitude, a longitude, and an elevation above the road level.

* * * * *